(12) United States Patent
Song et al.

(10) Patent No.: US 12,417,622 B2
(45) Date of Patent: *Sep. 16, 2025

(54) SYSTEMS AND METHODS OF INTERACTIVE VISUAL GRAPH QUERY FOR PROGRAM WORKFLOW ANALYSIS

(71) Applicant: Robert Bosch GmbH, Stuttgart (DE)

(72) Inventors: Huan Song, San Jose, CA (US); Zeng Dai, Santa Clara, CA (US); Panpan Xu, Santa Clara, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 824 days.

This patent is subject to a terminal disclaimer.

(21) Appl. No.: 17/478,478

(22) Filed: Sep. 17, 2021

(65) Prior Publication Data

US 2023/0086327 A1    Mar. 23, 2023

(51) Int. Cl.

| | |
|---|---|
| *G06V 10/82* | (2022.01) |
| *G06F 16/532* | (2019.01) |
| *G06F 18/2413* | (2023.01) |
| *G06V 10/86* | (2022.01) |
| *G06V 20/64* | (2022.01) |

(52) U.S. Cl.
CPC ............ *G06V 10/82* (2022.01); *G06F 16/532* (2019.01); *G06F 18/24143* (2023.01); *G06V 10/86* (2022.01); *G06V 20/64* (2022.01)

(58) Field of Classification Search
None
See application file for complete search history.

(56) References Cited

U.S. PATENT DOCUMENTS

| | | | | |
|---|---|---|---|---|
| 9,959,647 | B1 * | 5/2018 | Brost ................... | G06V 10/426 |
| 2021/0263962 | A1 * | 8/2021 | Chang ................. | G06F 18/2431 |
| 2022/0058429 | A1 * | 2/2022 | Zou ..................... | G06V 10/761 |

(Continued)

FOREIGN PATENT DOCUMENTS

| | | | | |
|---|---|---|---|---|
| CN | 108509452 A | * | 8/2018 | |
| CN | 112069336 A | * | 12/2020 | ........... G06F 16/532 |
| WO | WO-2021042084 A1 | * | 3/2021 | ......... G06F 16/5854 |

OTHER PUBLICATIONS

Bai, Y.—"SimGNN: A Neural Network Approach to Fast Graph Similarity Computation"—WSDM—Feb. 2019, pp. 384-392 (Year: 2019).*

(Continued)

*Primary Examiner* — Bernard Krasnic
(74) *Attorney, Agent, or Firm* — Dickinson Wright PLLC

(57) ABSTRACT

Systems and methods are disclosed for identifying target graphs that have nodes or neighborhoods of nodes (subgraphs) that correspond with an input query graph. A visual analytics system supports human-in-the-loop, example-based subgraph pattern search utilizing a database of target graphs. Users can interactively select a pattern of nodes of interest. Graph neural networks encode topological and node attributes in a graph as fixed length latent vector representations such that subgraph matching can be performed in the latent space. Once matching target graphs are identified as corresponding to the query graph, one-to-one node correspondence between the query graph and the matching target graphs.

17 Claims, 13 Drawing Sheets

(56) References Cited

U.S. PATENT DOCUMENTS

2022/0391433 A1* 12/2022 Maheshwari ........ G06N 3/0464
2023/0089148 A1* 3/2023 Dai .......................... G06N 3/09
                                                              382/103

OTHER PUBLICATIONS

Kong, X.—"Semantic Graph Based Place Recognition for 3D Point Clouds"—arXiv—Aug. 26, 2020—pp. 1-8 (Year: 2020).*
Cortes, X.—"Active Graph Matching Based on Pairwise Probabilities between Nodes"—SPR 2012—pp. 98-106 (Year: 2012).*
J. Shotton, J. Winn, C. Rother, and A. Criminisi. Textonboost: Joint appearance, shape and context modeling for multi-class object recognition and segmentation. In European conference on computer vision, pp. 1-15. Springer, 2006.
Z. Lou, J. You, C. Wen, A. Canedo, J. Leskovec, et al. Neural subgraph matching. arXiv preprint arXiv:2007.03092, 2020.
W. L. Hamilton, R. Ying, and J. Leskovec. Inductive representation learning on large graphs. arXiv preprint arXiv:1706.02216, 2017.
L. P. Cordella, P. Foggia, C. Sansone, and M. Vento. A (sub) graph isomorphism algorithm for matching large graphs. IEEE Transactions on Pattern Analysis and Machine Intelligence, 26(10):1367-1372, 2004.
J. Munkres. Algorithms for the assignment and transportation problems. Journal of the society for Industrial and applied mathematics, 5(1):32-38, 1957.
M. Neumann, R. Garnett, C. Bauckhage, and K. Kersting. Propagation kernels: efficient graph kernels from propagated information. Mach. Learn., 102(2):209-245, 2016.
J. R. Ullmann. An algorithm for subgraph isomorphism. Journal of the ACM (JACM), 23(1):31-42, 1976.
X. Gao, B. Xiao, D. Tao, and X. Li. A survey of graph edit distance. Pattern Analysis and applications, 13(1):113-129, 2010.
L. Van der Maaten and G. Hinton. Visualizing data using t-sne. Journal of machine learning research, 9(11), 2008.
E. R. Gansner, E. Koutsofios, S. C. North, and K.-P. Vo. A technique for drawing directed graphs. IEEE Transactions on Software Engineering, 19(3):214-230, 1993.

* cited by examiner

Query Graph $G_Q$ Target Graph $G_T$

SYSTEMS AND METHODS OF INTERACTIVE VISUAL GRAPH QUERY FOR PROGRAM WORKFLOW ANALYSIS

CROSS-REFERENCE TO RELATED APPLICATION

The present application is related to co-pending application Ser. No. 17/478,423, titled SYSTEMS AND METHODS FOR INTERACTIVE IMAGE SCENE GRAPH PATTERN SEARCH AND ANALYSIS, filed on the same date as the present application by the same Applicant. The co-pending application Ser. No. 17/478,423 is not prior art to the present disclosure, but its disclosure is hereby incorporated by reference in its entirety.

TECHNICAL FIELD

The present disclosure relates to systems and methods of providing an interactive visual graph query for program workflow analysis. This disclosure relates to performing subgraph pattern searching with human-in-the-loop visual analytics.

BACKGROUND

A variety of techniques exist for organizing resources, describing relationships, and otherwise storing data about things represented electronically. One such technique is the use of graph structures, or graphs. Graphs are non-linear data structures having nodes and edges. The nodes are sometimes referred to as vertices, and the edges are lines or arcs that connect any two nodes in the graph. Two different graphs can be compared and corresponded for analysis in similarities by matching one graph (or a portion thereof) to another graph (or a portion thereof).

A Graph Neural Network (GNN) is a type of neural network which directly operates on the graph structure. A typical application of GNN is node classification, in which every node in the graph is associated with a label. The GNN can then function to compare the graphs or portions thereof where nodes and neighboring nodes can be compared. Graph context and labels of nodes can be predicted using aggregated information.

SUMMARY

A first embodiment illustrates a computer-implemented method for performing subgraph pattern searching with human-in-the-loop visual analytics. The computer-implemented method includes storing, in memory, a graph database containing a plurality of target graphs, each target graph having a plurality of target nodes connected by edges; receiving, via a user interface, a query graph having a plurality of query nodes; via a graph neural network, retrieve one or more matching target graphs from the graph database that contain the query graph; extracting embeddings of each of the query nodes and each of the target nodes of the one or more matching target graphs; performing a comparison of the embeddings of each query node with the embeddings of each target node of the one or more matching target graphs; and generating, via the user interface, a graphical depiction of a one-to-one node correspondence between the query nodes and the target nodes of the one or more matching target graphs based on the comparison.

A second embodiment illustrates a visual analytics system configured to support human-in-the-loop subgraph pattern searching. The visual analytics system includes a user interface, a memory storing a target graph database having a plurality of target graphs, each target graph having a plurality of target nodes connected by edges, and a processor. The processor is programmed to, via the user interface, receive a query graph having a plurality of query nodes, via a first graph neural network, retrieve one or more matching target graphs from the target graph database, wherein each of the one or more matching target graphs contains the query graph, via a second graph neural network, compare the query nodes with the target nodes of the one or more matching target graphs by determining a similarity between the query nodes and the target nodes of the one or more matching target graphs, and generate, on the user interface, a graphical depiction of a one-to-one node correspondence between the query nodes and the target nodes of the one or more matching target graphs.

A third embodiment discloses a system that includes a memory storing a target graph database having a plurality of target graphs, each target graph having a plurality of target nodes connected by edges, and a processor communicatively connected to the memory. The processor is programmed to receive a query graph having a plurality of query nodes, retrieve one or more matching target graphs from the target graph database, wherein each of the one or more matching target graphs contains the query graph, determine a similarity between the query nodes and the target nodes of the one or more matching target graphs with a one-to-one node correspondence, and generate a graphical depiction of the one-to-one node correspondence.

DETAILED DESCRIPTION

Figure 1:
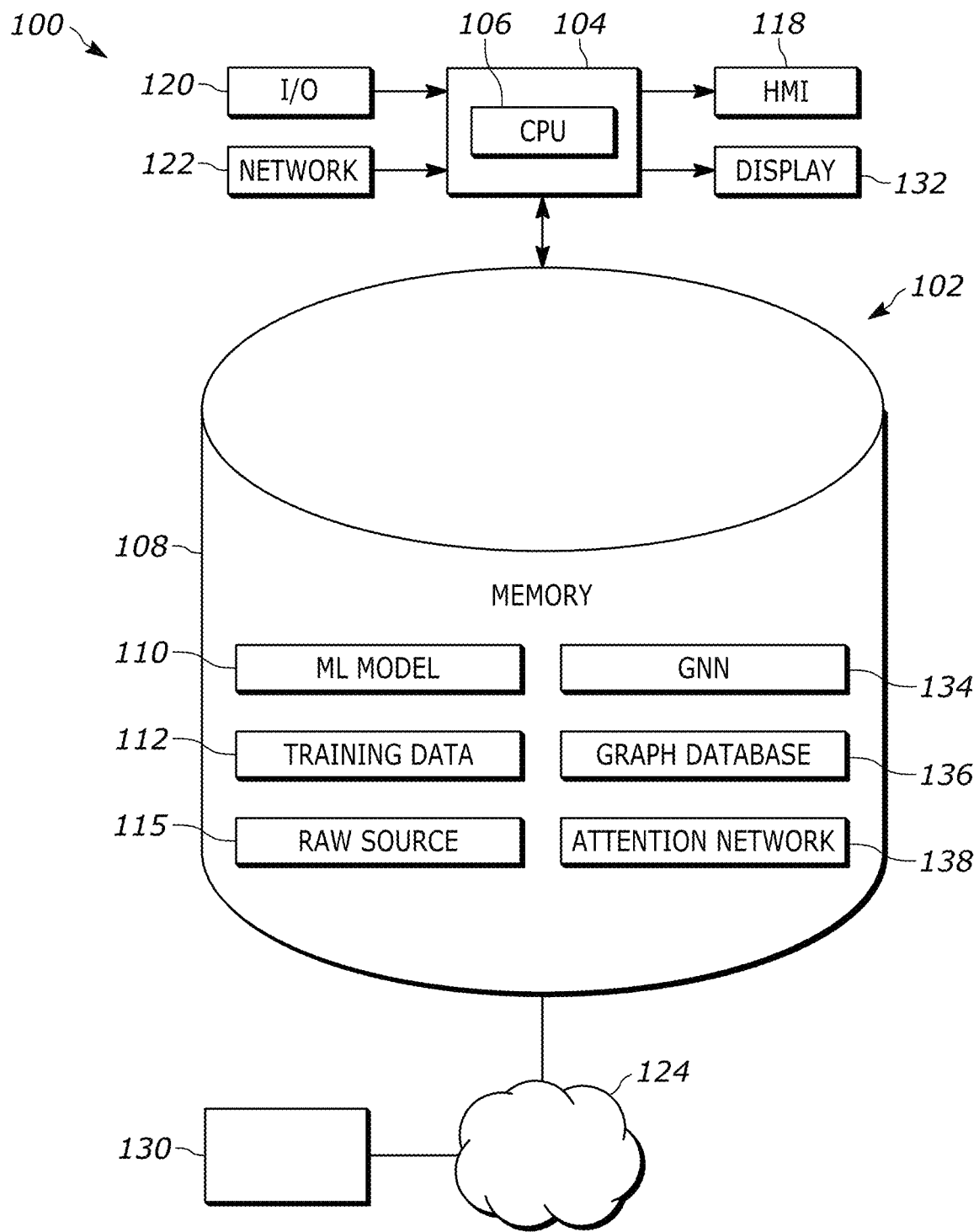
FIG. 1 is a schematic diagram of a system that performs subgraph pattern searching with human-in-the-loop visual analytics, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A graph is a data structure consisting of two components—nodes (or vertices) and edges. The nodes may consist or be embedded with associated data such as a classification, and the edges connect adjacent nodes. Graph data structures can be applied in a variety of real-world applications, such as business processes, control flow graphs in programs, social connections, knowledge graphs, and semantic scene graphs in image analysis. Visually identifying and searching for persistent subgraph patterns is a common and important task in graph analysis. For example, searching for graph motifs such as cliques or stars in a social network reveals the community structures or influencers; searching for similar workflow templates helps streamline or simply business processes; searching for images with similar scene graphs helps systematic retrieval of training/testing cases to develop models for computer vision tasks.

This disclosure provides a visual analytics system to support human-in-the-loop, example-based subgraph pattern search in a database containing many individual workflow graphs. The approach disclosed herein goes beyond a predefined set of motifs and allows users to interactively specify the patterns or subgraphs of interest. However, most combinatorial algorithms are not well-suited for interactive queries from a human. This disclosure therefore uses graph neural networks (GNNs) to encode topological and node attributes in a graph as fixed length latent vector representations. Subgraph matching is therefore performed in the latent space, which significantly speeds up the query process. Furthermore, the complexity of the subgraph matching problem also makes it difficult to obtain accurate one-to-one node correspondence in the matching results, which is crucial for visualization and interpretation. This disclosure therefore provides a novel GNN for node-alignment which can directly output one-to-one node correspondence between the query graph and the target graphs. The user is able to easily validate and interpret the query results by visualizing the node correspondence and comparison. The visual analytics system provides a visual query interface with a query editor and multi-scape visualization of the results, as well as user feedback mechanisms for refining the results with additional constraints.

Graph structure models a wide range of processes and relations in real-world applications. This disclosure in particular considers graphs describing an example of a real-world application in the form of workflows in vehicle diagnostic software programs. The software program can use pre-scripted workflow graphs to check the functionalities of the system and locate the problem in the vehicles. The workflows are modeled as directed graphs where each node represents an individual procedure in the workflow and the link (edge) represents their sequential orders.

Visually identifying and searching for persistent subgraph pattern is a common and important task in graph analysis. For workflow graphs, subgraph pattern query can identify subroutines in the workflow that are reused frequently and therefore can be used as templates, or submodules in the future to facilitate the workflow editing process or to simplify the workflow descriptions. However, identifying such frequent subroutines cannot be easily automated—substantial domain knowledge in automotive hardware and software systems is needed to curate meaningful patterns, and therefore a human-in-the-loop approach is disclosed herein.

A goal of this disclosure is to support human-in-the-loop, example-based graph pattern search in a graph database, which could contain hundreds to thousands of individual graphs. Supporting interactive, example-based visual graph pattern queries is challenging. Graph motif or pattern finding algorithms often impose limits on the size of the query pattern and do not scale well as the size of the query pattern and the number or the size of the query targets increases. As an example of the computational complexity of subgraph matching problems, determining whether a 10-node graph is a subgraph of a 20-node graph could easily take five minutes when connectivity is slightly dense. Furthermore, the complexity of the subgraph matching problem also makes it difficult to obtain accurate one-to-one node correspondence in the matching results. Additionally, it is quite often that domain knowledge is needed to further refine and adjust the results, which cannot be easily supported in algorithms with heavy computational costs.

The systems and methods disclosed herein provide a novel framework for interactive visual graph pattern searching via graph representation learning. This disclosure leverages GNNs to encode topological as well as node attribute information in a graph as fixed-length vectors. The GNNs are applied to both a query graph and the target graphs stored in memory to obtain their respective vector representations. The graph matching is transformed into a high-dimensional vector comparison problem, which greatly reduces the computational complexity. In particular, two separate GNNs can be leveraged, with a first GNN to address a first problem in determining whether a query pattern exists in a graph, and a second GNN to address a second problem in finding the one-to-one node correspondence between the query graph and target graphs. For the first problem, a subgraph matching system (referred to as NeuroMatch) is leveraged. For the second problem, an alignment system (referred to as NeuroAlign) is leveraged. The NeuroAlign system can directly generate cross-graph node-to-node attention scores indicating the node correspondences. In some applications, vector representations of the query targets can be precomputed and stored for efficient retrieval of the graph matching results. The visualization interface enables easy search and specification of the graph query patterns. Since the query engine can return a large number of matching target graphs that contain the query graph, the results can be presented with different levels of details that show the matching target graphs in space-efficient, thumbnail style representations. They can also be sorted via a variety of criteria. Users can also interactively specify additional constraints to further filter the returned results based on their domain knowledge.

FIG. 1 is a schematic diagram of a visual analytics system 100 that performs subgraph pattern searching with human-in-the-loop visual analytics, according to an embodiment. The system 100 may include at least one computing system 102. The computing system 102 may include at least one processor 104 that is operatively connected to a memory unit 108, or memory. The processor 104 may include one or more integrated circuits that implement the functionality of a central processing unit (CPU) 106. The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, raw source dataset 115, one or more GNNs 134, a graph database 136, and an attention network 138.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124. The one or more servers 130 may have the memory and processors configured to carry out the GNNs and systems disclosed herein.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122. The HMI 118 and display 132 may collectively provide a user interface to the user, which allows interaction between the human user and the processor(s) 104.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors, and the system illustrated in FIG. 1 is merely an example.

The system 100 may implement a machine-learning algorithm 110 that is configured to analyze the raw source dataset 115. The raw source dataset 115 may include raw or unprocessed sensor data or image data that may be representative of an input dataset for a machine-learning system. The raw source dataset 115 may include video, video segments, images, text-based information, and raw or partially processed sensor data (e.g., radar map of objects). In some examples, the machine-learning algorithm 110 may be a neural network algorithm that is designed to perform a predetermined function. For example, the neural network algorithm may be configured in automotive applications to identify items (e.g., pedestrians, signs, buildings, sky, road, etc.) in images or series of images (e.g., video), and even annotate the images to include labels of such items. The neural network algorithms of the machine-learning algorithm 110 may include GNN, although the GNNs disclosed herein are illustrated as a separate component in memory 108.

The computer system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source images or videos with and without items in the scene and corresponding presence and location information of the item.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations, latent variables, adversarial noise, etc.) with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The GNN 134 is a neural network that directly operates on the graph structures stored in graph database 136 (e.g., target graphs) as well as input query graphs. Each node in the graphs are associated with a label. For example, in the context of a stored image (e.g., an image database stored in the memory), nodes may include labels for pedestrians, signs, buildings, the sky, roads, and the like that are found in the image. A corresponding graph of that image can be stored in the graph database 136 which may have these labels stored as ground truth, while the input query graphs may include a graph with a desired node or nodes, wherein the GNN is configured to operate to search the target graphs stored in the graph database 126 that include the query graph as a subset within the target graphs. The attention network 138 includes processing techniques for the GNN that allows the GNN to focus on specific aspects of a complex input, one at a time until the entire dataset is categorized.

Figure 2:
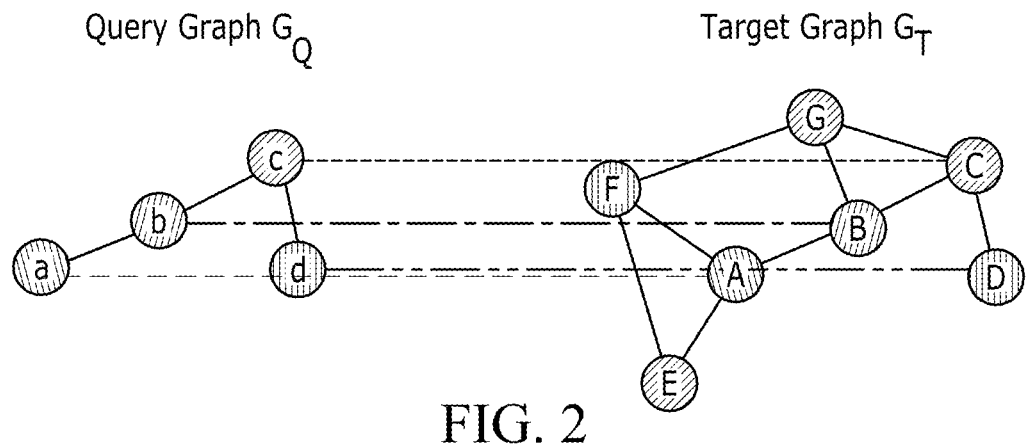
FIG. 2 is a diagram illustrating subgraph matching between a query graph and a target graph, according to an embodiment.

The system is configured to match a query graph with one or more target graphs stored in the graph database 136. Each graph includes vertices and edges. An undirected, connected graph can be denoted G=(V, E) with vertex set V and edge set E, X as the features associated with V (e.g., categorical attributes). FIG. 2 provides a visual illustration of the subgraph matching process. The user can input (e.g., via HMI 118) a query graph $G_Q$ that includes one or more nodes. In this example, four nodes are input, nodes a, b, c, and d. For example, the user may desire to find all images having visible the sky (node a), a building (node b), a road (node c) and a tree (node d). Various target graphs $G_T$ are stored in memory. Given a query graph and a target graph, the decision problem determines whether there exists a subgraph $H_T \in G_T$, such that $G_Q$ is isomorphic to $H_T$. When $H_T$ exists (i.e., $G_Q$ is subgraph-isomorphic to $G_T$), the system considers the node alignment problem which looks for an injective mapping function $f: V_Q \to V_T$ such that $\{(v), (u)\} \in E_T$ if $\{v,\} \in E_Q$. When the node features X exist, the matching requires equivalence of the feature too. Referring to the example in FIG. 2, each node is colored where the colors encode node categorical features (e.g., sky, building, road, tree, etc.) and the letters are the node names. The example query graph $G_Q$ is a subgraph of $G_T$ with the correct node alignment of (a)=A, (b)=B, $f(c)$=C, $f(d)$=D. The target graph database 136 may be large, where the task is to solve the above decision problem and node-alignment problem for each of the target graphs.

As will further be described with reference to the remaining Figures, the system 100 can include two main components: NeuroMatch (e.g., subgraph matching of a query graph $G_Q$ to at least a portion of a target graph $G_T$) and NeuroAlign (e.g., node alignment). Given a graph database 136 and user-created query graph, the system 100 utilizes the NeuroMatch method to efficiently retrieve matching target graphs which contain the query graph. NeuroMatch decomposes the graphs into small neighborhoods to make fast decisions locally and then aggregates the results. After a matching target graph is found, the node alignment between the two graphs can still be ambiguous. Therefore, the system includes NeuroAlign which computes node-to-node attention based on graph node embeddings to obtain the alignment results. Finally, the matching target graphs and corresponding matching nodes are provided to the user visually (e.g., on display 132) for interactive exploration and analysis.

GNN is used as the backbone of the subgraph matching and node alignment models. The general idea of the GNN is to learn latent representations of graph nodes, such that they can incorporate node attribute and topological information from their surrounding neighborhoods in the graph. Simplified, GNN can be used to perform representation learning, where the input is a given graph and the output is a set of embeddings at every node in the graph. Optionally a pooling layer can be added on top of the node embeddings to obtain a single embedding of the input graph. The system 100 can use, for example, GraphSAGE architecture for graph representation learning. This is but one example; other GNN architectures can be used too.

It is desirable to perform subgraph matching in the node embedding space to facilitate efficient retrieval, where the embedding can be a vector (e.g., length of 64) that encodes both the attributes of the node, its neighbors, and the connectivity of the neighbors. However, given a large graph database, it is challenging to define a concrete task to learn the predictive model. A naive approach is to simply take random pairs of graphs in the database as learning examples and their subgraph relationship as labels. This approach is infeasible since testing for subgraph isomorphism even on a single pair of graphs can take a long time with heuristic method. The large size of some graphs and the overall database makes this approach even more challenging. NeuroMatch resolves this issue by decomposing the given query and target graphs into many small regions and learns the subgraph relationship in these small regions first. In particular, for each node q in the query graph, it extracts a small k-hop neighborhood graph $g_q$. For each node t in the target graph, it also extracts their k-hop neighborhood $g_t$. Then the problem of determining whether $G_Q \subseteq G_T$ transforms into many local subgraph matching decisions about whether $g_q \subseteq g_t$. To find potential local matches, NeuroMatch compares all pairs of nodes between the query and target graphs. Finally, the ensemble decision can be made by checking whether every query neighborhood can find a matching target neighborhood.

Figure 3:
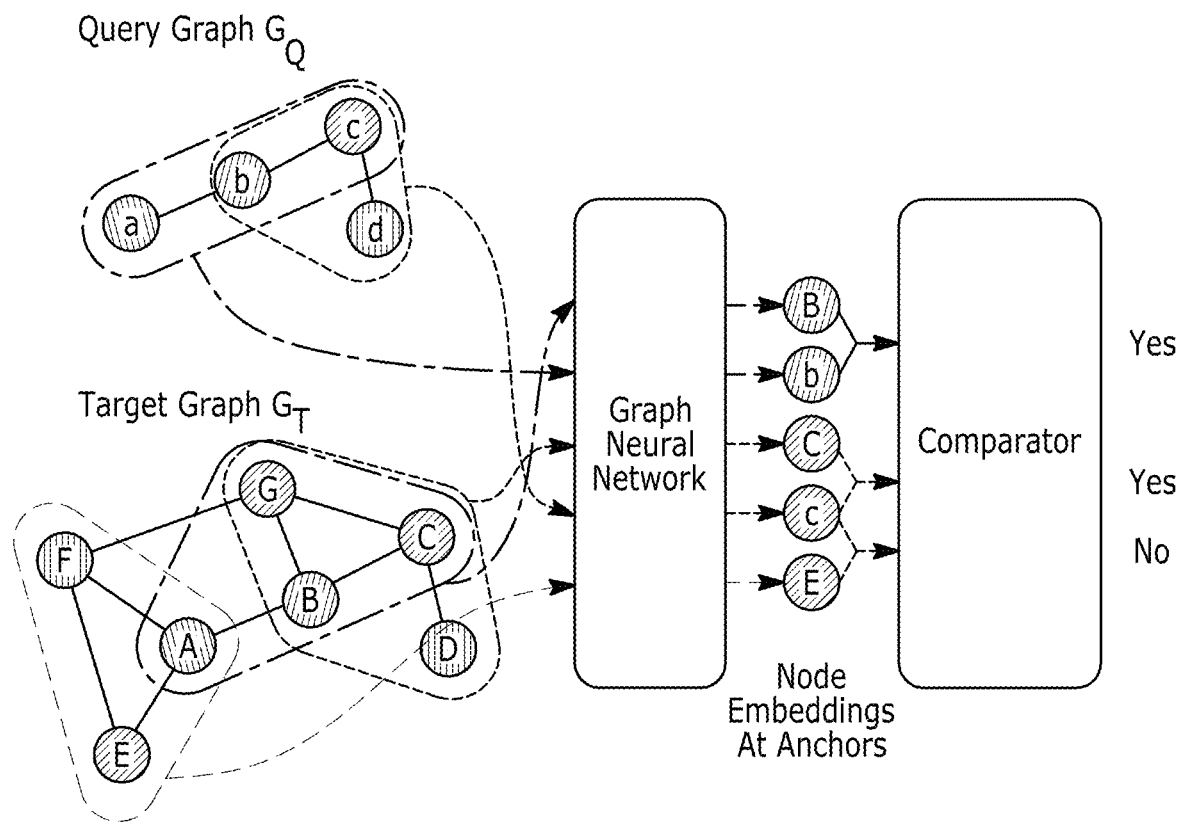
FIG. 3 is a diagram illustrating a system of determining whether the query graph is a subgraph of the target graph, according to an embodiment using a GNN.

FIG. 3 illustrates one embodiment of a system 300 for determining whether the query graph $G_Q$ is a subgraph of the target graph $G_T$, according to an embodiment. This is referred to as the NeuroMatch system. The NeuroMatch system looks for local matches between the query graph and the target graphs in the graph database, and then aggregates the results. In FIG. 3, boundary lines are drawn around the 1-hop local neighborhoods of anchor nodes b and c in the query graph as an example. In other words, one line is drawn around nodes a, b, and c since nodes a and c are 1-hop neighbors from node b, and another line is drawn around nodes b, c, and d since nodes b and d are 1-hop neighbors from node c. It should be understood that similar methods may be used with 2-hop neighbors, i.e., nodes that are separated from the anchor node by one node. It should also be understood that in practice, the k-hop neighborhoods at all nodes of the query graph and the target graphs can be extracted and compared. The NeuroMatch system compares these 1-hop neighborhoods with those in each target graph in the graph database 136. In the illustrated example, the NeuroMatch algorithm finds that the 1-hop neighborhood graph of b of the query graph is a subgraph of the 1-hop neighborhood of B of the target graph, and the 1-hop neighborhood of c is a subgraph of the neighborhood of C of the target graph. In other words, the 1-hop neighbors of node b include nodes a and c, and the 1-hop neighbors of similar node B of the target graph also include nodes A and C (along with node G); the 1-hop neighborhood graph of node b is therefore a subgraph of the 1-hop neighborhood of node B. In the illustrated example, since each node a, b, c, and d can find a matching neighborhood graph in the target graph $G_T$ (nodes A, B, C, and D), the NeuroMatch algorithm concludes that indeed $G_Q$ is a subgraph of $G_T$.

The system proceeds to determine the local subgraph relationship, i.e., whether the k-hop neighborhood graph $g_q$ is a subgraph of $g_t$. To determine local subgraph relations, the NeuroMatch system feeds these k-hop neighborhood graphs $g_q$ and $g_t$ into a GNN to extract the respective anchor node embeddings at q and t, i.e., the vector that encodes both the attributes of the node and its connectivity with other nodes. A comparator function takes each pair of these embeddings and predicts the subgraph relationship as shown in FIG. 3 to make local decisions. The comparator enforces the embeddings of the neighborhoods to follow certain order if the subgraph relationship exists. In the illustrated example, the comparator notes a correspondence of neighbors in similar nodes B and b, and a correspondence of neighbors in similar nodes C and c. The comparator is also configured to determine when a match is not present. For example, in the illustrated embodiment of FIG. 3, a 1-hop neighborhood of node E is computed, determining nodes F and A are included in this neighborhood. The comparator notes that the anchor node E does not have a 1-hop neighborhood that compares with node c, and thus no match is made. The process can repeats for each node in the query graph and the target graph.

Training this NeuroMatch system 300 can utilize training data 112 and involve sampling large amounts of mini-batches containing both positive and negative pairs. A positive pair consists of two neighborhood graphs $g_q$ and $g_t$ that satisfy the subgraph relationship. Since $g_q$ is contained in $g_t$, $g_t$ is sampled first. Specifically, for each target graph $G_T$ in the graph database, a random anchor node t is sampled, and the k-hop neighborhood is extracted as $g_t$. Then a subgraph within $g_t$ is sampled as the query neighborhood $g_q$.

Negative samples can be critical to distinguish true subgraph isomorphisms as it provides examples when the subgraph relationship is violated. From target neighborhood $g_t$ sampled above, a smaller neighborhood is sampled from a different graph as $g_q$. The query neighborhood $g_q$ needs to be verified with exact matching protocol to ensure $g_q \not\subseteq g_t$. In practice, we find that these negatives alone pose an easy task for the model and the training results in many false positive predictions of the matching target graphs. To alleviate this issue, the system also samples hard negatives which are obtained by perturbing the above positive pair $(g_q \subseteq g_t)$ such that the subgraph relationship no longer exists. The system perturbs the positive pair by randomly adding edges to $g_q$ and verifies the success with exact matching. As can be seen, negative sampling extensively invokes exact matching algorithm, which is slow to compute. To keep the training tractable, the system can set small neighborhood hop k=3 (at most) for example, and can also limit the number of nodes to sample from the neighborhood to, for example 30.

After the model is trained, the system pre-computes and stores embeddings of all graphs in the database. The inference process iterates through all pairs of query nodes and target nodes, and utilizes the trained comparator to make local subgraph decisions. The aggregated decision is then made by checking whether each query neighborhood finds a match. This process has linear complexity in terms of both query and target number of nodes, thus facilitating efficient retrieval at the front-end interface.

When a matching target graph is retrieved and visualized, it may still be difficult for the user to extract insights when the target graph is large and the topology is complex. In this case showing the corresponding nodes can provide intuitive and explainable visual cues. Although NeuroMatch can provide node correspondence when the neighborhoods match at their anchor nodes (i.e. $q \in g_q$ and $t \in g_t$), the overall alignment can still be ambiguous and misleading based on what we observe in the experimental results. This is due to the fact that the learning process of NeuroMatch relies entirely on small neighborhoods within the graphs. As a result, each query node could end up matched to multiple target nodes where many of them may be false positives.

Figure 4:
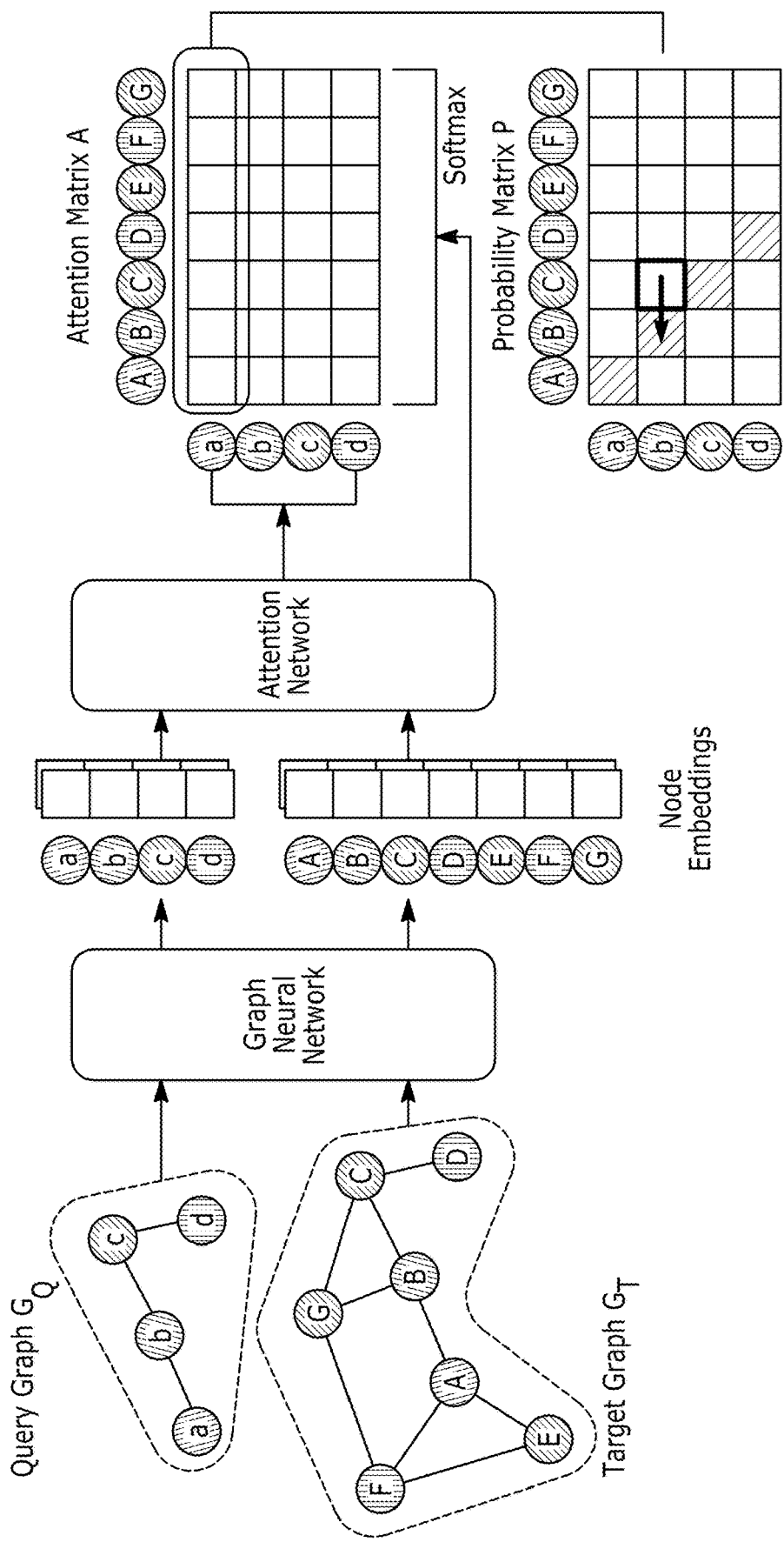
FIG. 4 is a diagram illustrating a system of obtaining node-to-node correspondence between the query graph and the target graph, according to an embodiment using a GNN and an attention network.

This disclosure therefore provides a NeuroAlign system configured to directly predict matching nodes on the entire query and target graphs, without segmenting them into small neighborhoods. FIG. 4 illustrates an over of the NeuroAlign system, i.e. a system 400 configured to obtain accurate node-to-node correspondence. The system 400 extracts embeddings of each node in the query graph and the target graph by directly feeding them through a GNN. It then uses an attention network to compare every pair of node embeddings between the query and target graphs. These pair-wise comparison results can be formed as a matrix, with the rows corresponding to query nodes and columns corresponding to target nodes. The matrix is then transformed into a probability matrix through soft max on each row. A greedy assignment algorithm resolves potential conflicts (illustrated by the outlined box) during inference. The system 400 improves node alignment performance.

In more particular terms, the system 400 employs a flexible, cross-graph attention mechanism. As shown in FIG. 4, the processor(s) implementing the NeuroAlign system directly takes the node embeddings obtained from GNN on the entire graphs $G_Q$ and $G_T$. These embeddings are denotes as $\{h_q, \forall q \in G_Q\}$ and $\{h_t, \forall t \in G_T\}$. The system 400 then computes the similarity between each query embedding and every target embedding through an attention network. This process can be considered as creating an attention matrix $A \in \mathbb{R}^{\|V_Q\| \times \|V_T\|}$, where the element $A_{q,t}$ contains the attention from node q to t. The system then directly transforms the similarity matrix to a probability matrix $P \in \mathbb{R}^{\|V_Q\| \times \|V_T\|}$ using row-wise soft max in the cross-entropy loss. Formally, the system uses the following relationships:

$$A_{q,t} = \psi(h_q \| h_t)$$

$$P_q = \text{soft max}(a_q)$$

$$L(G_Q, G_T) = -\Sigma_{q \in G_Q} y_q \log(p_q)$$

where $\psi$ denotes the attention network, $a_q$ is the q-th row of A, and $y_q$ is the one-hot ground-truth label for node q, indicating which node in $G_T$ is the corresponding node of q. The prediction $P_q$ contains the probabilities of matching query node q to every target nodes. The system implements the attention network as a multi-layer perceptron, which takes a pair of embeddings produced by the GNN, concatenate the embeddings, and returns a similarity score between a node q in the query graph and a node t in the target graph. In case $G_T$ is too large, the computation of $A_{q,t}$ could consume too much memory and needs to be constrained to a subgraph t. In application, a user can specify the maximum size which covers most target graphs in the graph database.

Similar to NeuroMatch, for NeuroAlign, when the model is trained, the system can pre-compute all graph embeddings generated by NeuroAlign to make the retrieval process efficient. The embeddings of the nodes are not fixed, but rather are learned through the network training process. With NeuroAlign, after the training completes, the model is able to look at a pair of embeddings from the query nodes and target nodes, and infer whether they are a match or not. In addition, NeuroAlign works subsequently to NeuroMatch and only activates when a subgraph relationship is predicted, thus creating minimal computational overhead for visualization and interaction.

The training of NeuroMatch and NeuroAlign can be conducted separately, e.g., via separate training data 112. Training NeuroAlign (and its backbone GNN, such as GraphSAGE), can be simpler than training NeuroMatch. It can involve sampling only positive pairs, such that its objective is to improve node alignment when the subgraph decision has already been made that $G_Q \subseteq G_T$. Therefore, the sampling involves extracting random queries from the graphs in the database. For each target graph in the database, the training module can randomly sample a subgraph within it as $G_Q$. The ground-truth injection mapping is acquired directly in the sampling process, and it is converted to $y_q$ to indicate which node in the target graph is the corresponding node of q. NeuroAlign can be trained efficiently through this simple sampling process and without invoking expensive exact matching algorithms. In addition, NeuroAlign works subsequently to NeuroMatch and only activates when a subgraph relationship is predicted, thus creating minimal computational overhead for visualization and interaction.

As stated earlier, a greedy assignment for inference can be provided. During inference, ideally the query nodes need to be matched to unique target nodes. This can be achieved with a node assignment algorithm. Specifically, given the predicted probability matrix P, the system iterates the probabilities in descending order and records the corresponding matching pair only when both the query and target nodes have not been assigned. The iteration stops when all query nodes have been assigned. This simple process resolves conflicting assignment to the same target node and improves the overall node alignment performance.

In addition to the retrieval results obtained from the query graph, the system provides the option to perform approximate query matching. This method perturbs the query graph slightly, in order to obtain similar, but different matching graphs. Specifically, the system denotes the set of obtained matches from the original query graph $G_Q$ as R. One node and its associated edges are removed from $G_Q$ to obtain the perturbed query $\tilde{G}_Q$. Then the system conducts the search with NeuroMatch on $\tilde{G}_Q$ and adds the novel matches to R. The system continues the iteration by removing a node from $\tilde{G}_Q$, until either a pre-specified maximum number of steps is reached or $\tilde{G}_Q$ becomes disconnected. To lower the change of getting a disconnected graph, each time the system can remove the node with the lowest degree in $\tilde{G}_Q$.

Figure 5:
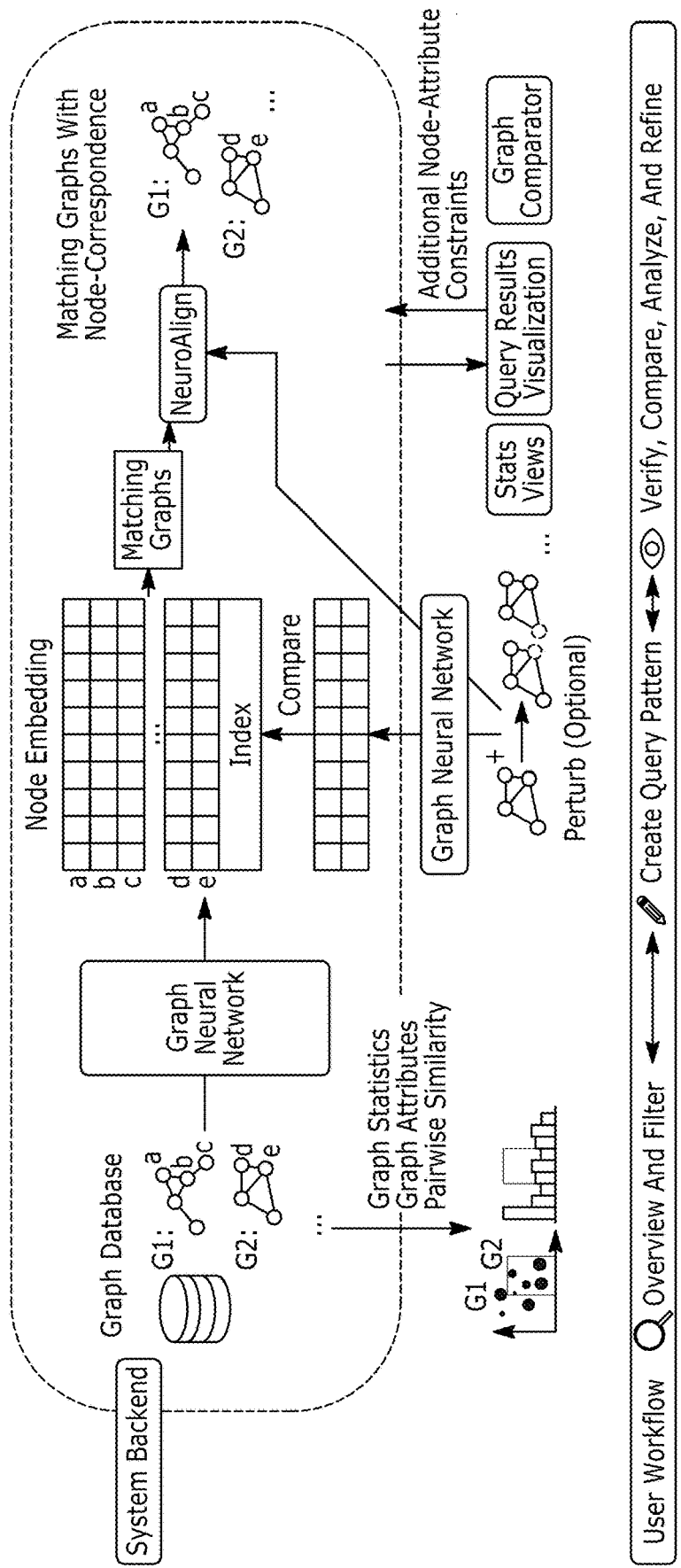
FIG. 5 illustrates an architecture of a system that performs subgraph pattern searching with human-in-the-loop visual analytics incorporating the systems of FIGS. 3 and 4, according to an embodiment.

FIG. 5 illustrates an example an architecture of a system 500 that performs subgraph pattern searching with human-in-the-loop visual analytics incorporating the systems (e.g., NeuroMatch and NeuroAlign) described herein. In general, the back-end precomputes and stores the graph representations to support efficient matching graph retrieval through NeuroMatch utilizing a first GNN. After the matching graphs are obtained, the system uses NeuroAlign and a second GNN to obtain accurate node-to-node correspondence to be displayed in the visualization provided on the user interface (e.g., graphical depiction on display 132) for the user to verify the results. The user workflow shows how the system would appear to the user; the user can start from an overview of all the graphs in the graph database and select one to construct an example based query pattern. The query pattern can be slightly perturbed to retrieve approximate matching results from the graph database. After the results are returned, the user can use a verity of views on the visualization to explore the returned results. The query results can be displayed in the front-end with multiple levels of detail that can be zoomed in/out by the user for different levels of details, and can be refined further by adding node-attribute constraints interactively in the query panel of the user interface.

Figure 6A:
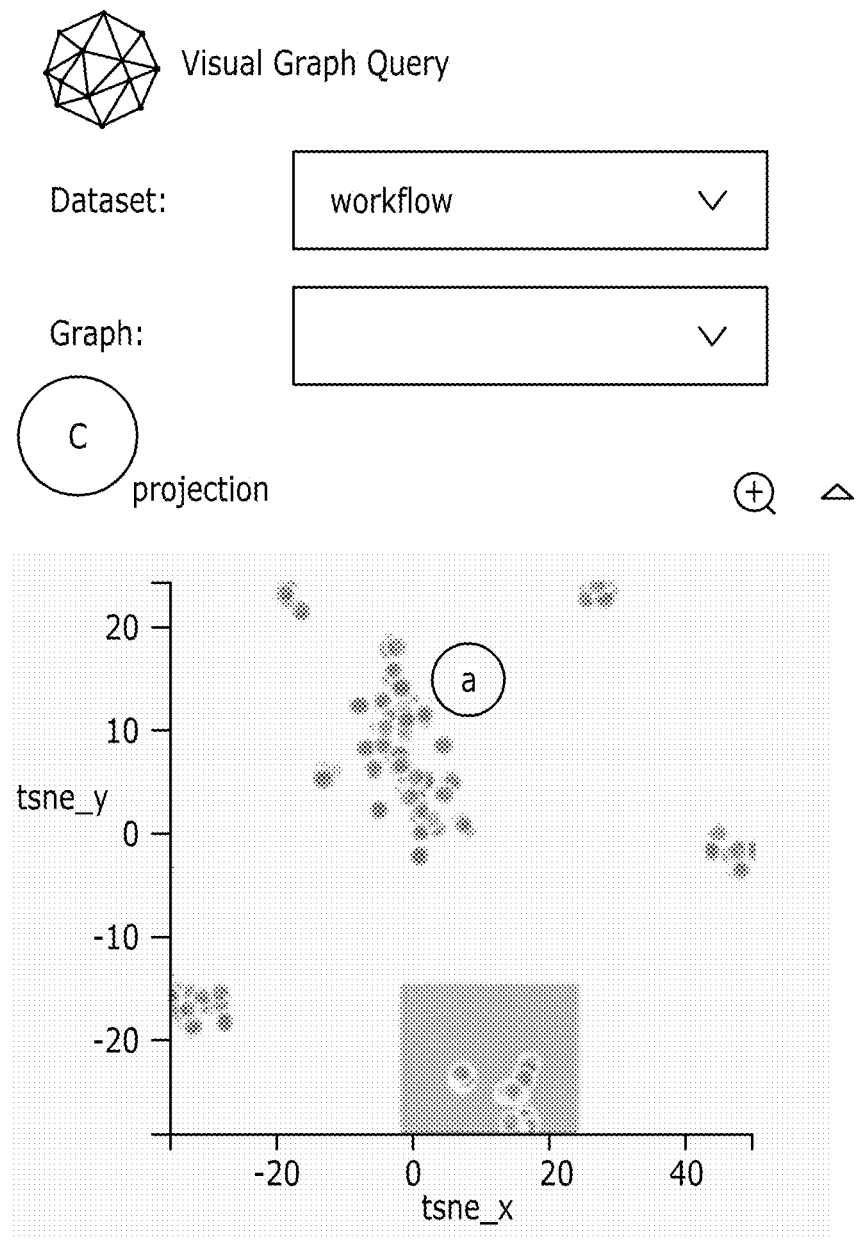
FIGS. 6A-6D illustrate a human-interactive graphical user interface for node correspondence and graph comparisons between the query nodes and the target nodes, according to an embodiment.
Figure 6A:
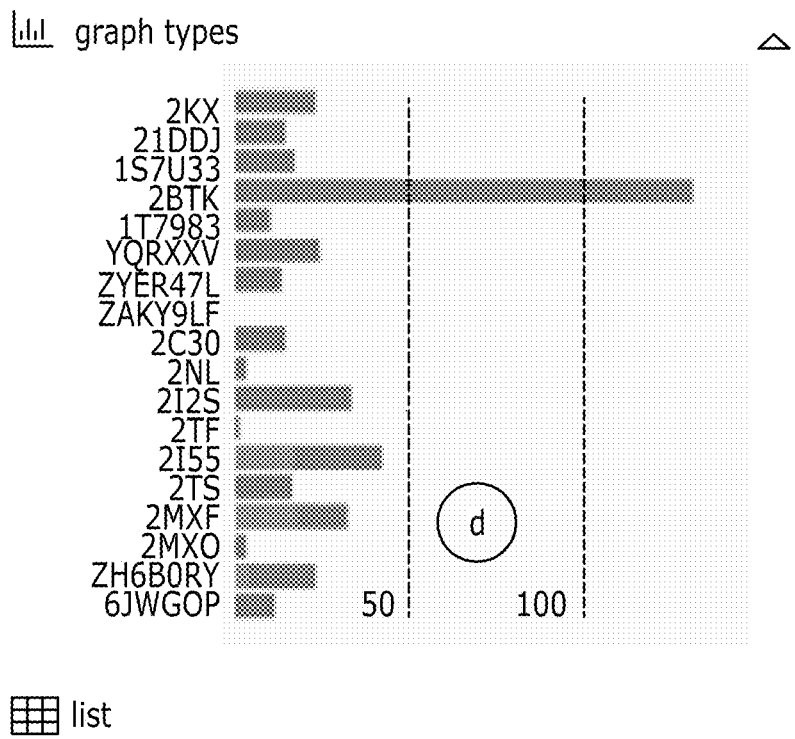
Figure 6B:
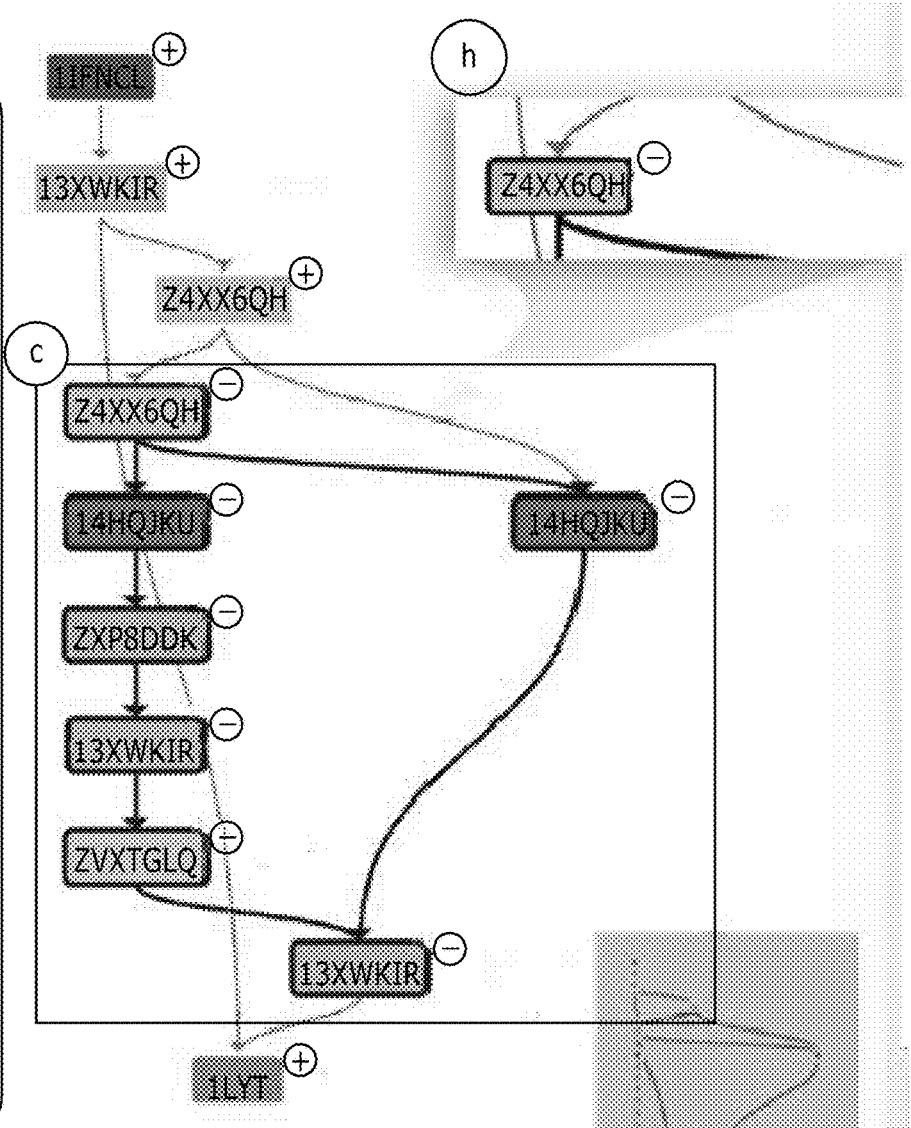
Figure 6C:
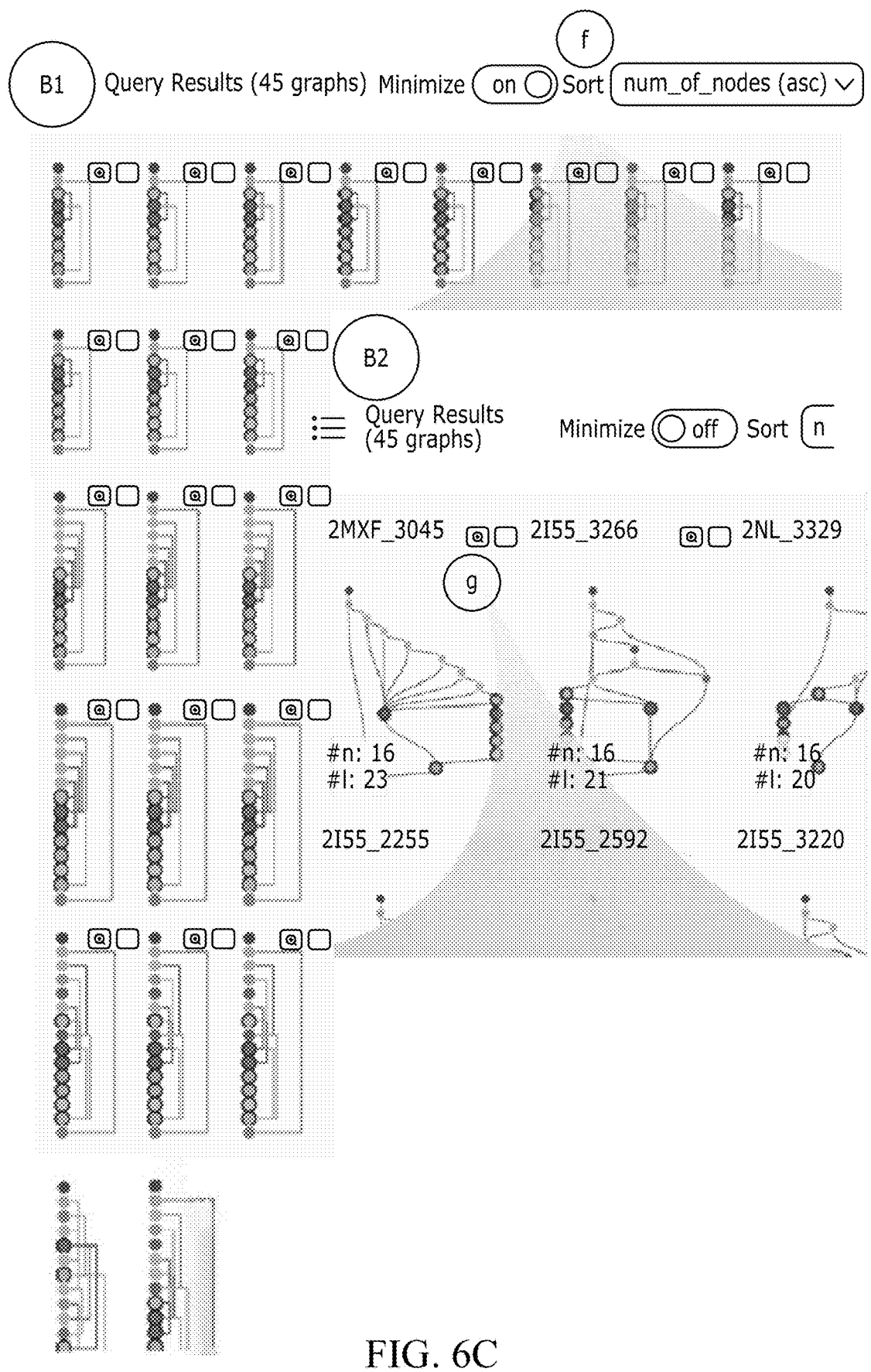
Figure 6D:
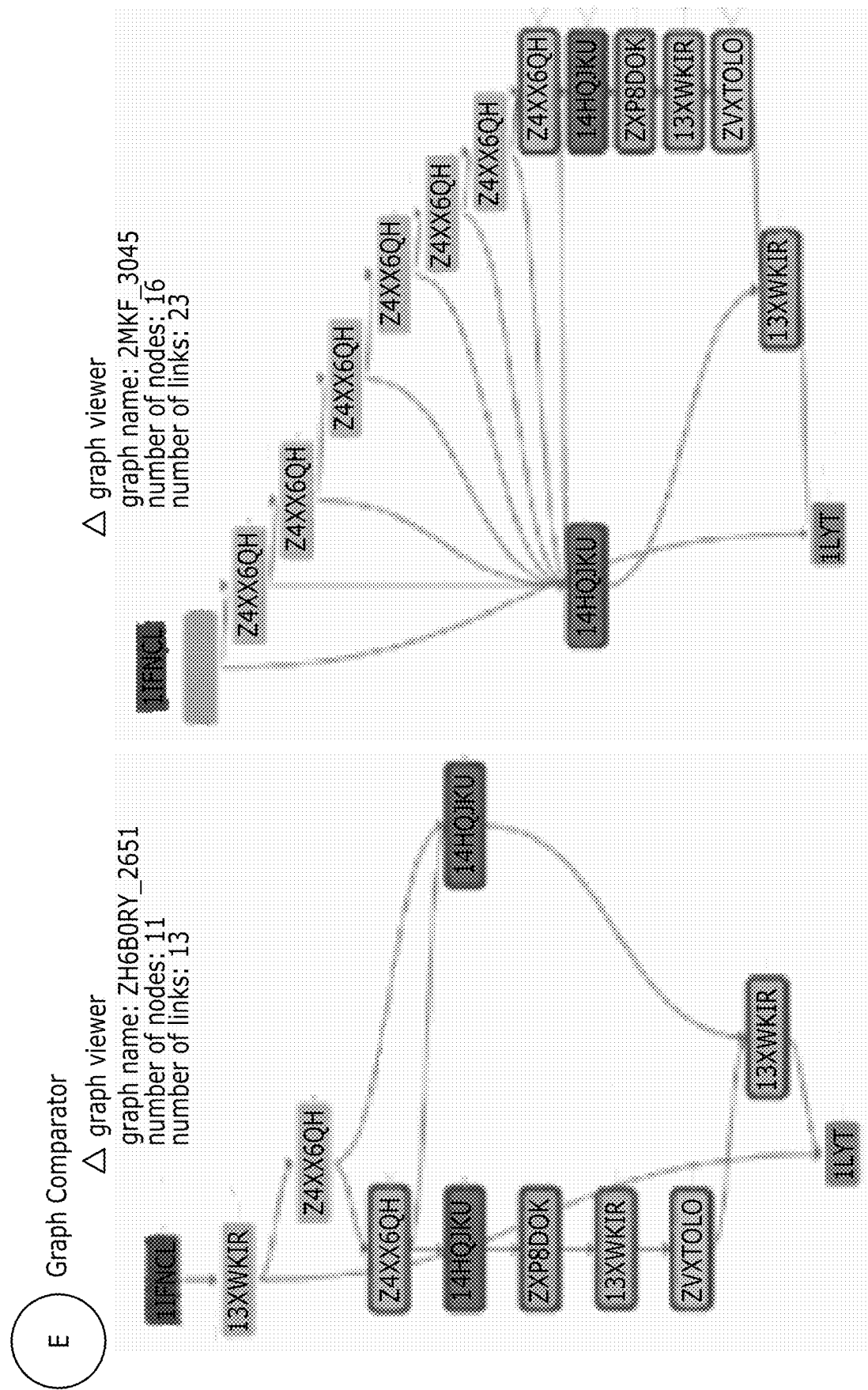

FIGS. 6A-6D illustrates one example of a user interface allowing visualization of the systems described herein. Referring to FIGS. 5 and 6, in general, the user interface implementing the system 500 allows the user to interactively select and refine graph patterns and analyze the retrieved results. At the same time, the system 500 allows the user interface to display the matching instances and explains the results by highlighting the node correspondences. Each of the FIGS. 6A-6D may be its own panel or region within a single graphical interface, or alternatively be may individual windows that can be closed, moved, minimized, or the like relative to one another. FIG. 6A is an example of a statistics and filter panel that helps users select a graph to construct example-based query and visualize the distribution of the query results in the database. FIG. 6B is an example of a query panel or query editing panel that allows a user to specify the subgraph patterns and initiate a search. FIG. 6C illustrates a query results panel for displaying the retrieved results, wherein graph thumbnails can be displayed in different modes for overview and detail. FIG. 6D is an example of graph comparator in the form of a popup window for pairwise comparison between the query pattern and the return result.

In application, to start the query process, the user is able to select from hundreds or thousands of graphs stored in the graph database. The system can provide the graph search and filtering functionalities based on the category, the name, or the graph statistics such as the number of nodes/links, for example. A visualization showing an overview of all graphs in the database can be useful to help locate interesting graphs or clusters. The user can then interactively construct the query pattern by selecting the pattern on the graph visualization. To minimize user effort, the system supports both bulk selection mechanisms such as brushing the graph regions as well as query refinement methods to add/delete individual nodes/edges from the pattern. The user can then interpret and validate the matched graphs via highlighted similarities and differences between the query graph and the target graphs. The node correspondences (and their differences) can be highlighted. The user can then explore the distribution of the matching instances. After the matched graphs are returned, the system can indicate how frequently the query pattern occurs in the entire database, and provide the distribution of the pattern among different categories of graphs in the database. The user can refine the query results; a flexible query system further supports query refinement where the users can apply their domain knowledge to filter the results with additional constraints, such as matching additional node attributes or limiting the results to a certain category of graphs.

Referring to FIGS. 6A-6D, the user interface can be provided with several windows or sub-interfaces that can either be visualized by the user simultaneously, or can be maximized or minimized by the user while operating the display 132 via HMI 118. The user interface can take the appearance of a website, or web-based interface, for example. In the illustrated embodiment, the user interface includes several sections, windows, or regions, including a query editing panel (A), a high-level query results window (B1) which can be expanded into a more detailed query results view (B2), (C) a statistics and filters panel (or an overview panel) that helps users select a graph to construct a query and visualize the distribution of the query results in the database, (D) a query option control panel to specify whether fuzzy-pattern search is enabled and whether the node-match should be highlighted, (E) a comparison view in a popup window for pairwise comparison between the query pattern and the returned result.

Regarding the overview panel labeled at (C), the system displays the distribution of key graph statistics such as the number of the nodes/edges as well as domain specific attributes such as the category of the graph. Both uni-variate distributions and bi-variate distributions can be displayed as histograms or scatterplots. Users can brush the charts and select a subset of graphs to create example-based query patterns.

To provide an overview of the graph structural information and help users navigate and select a graph to start the query, the system precomputes the graph editing distance which roughly captures the structural similarities between all pairs of graphs. A 2-dimensional projection coordinates of the graph can then be precomputed using, for example, t-distributed stochastic neighbor embedding (t-SNE) based on the distance matrix stored as additional graph attributes (e.g., in the graph query panel (A)). After the query result is obtained the charts are updated to provide a contextual view about how the sub-graph pattern occur in the database. For example, the user can observe whether the pattern occurrence concentrate on a small subset of graph categories or it is a generic pattern that appears in many different categories.

Furthermore, the overview panel (C) is a customizable module which can be configured specifying the attributes to be displayed and the chart to display it. Users can also interactively fold each chart and hide it in the display, such that space can be used for keeping important attribute information on the screen. The system also displays a pop up window to show detailed information for selected charts.

Regarding the graph query panel labeled (A), the user can interactively select from a graph instance to construct the query pattern. The color of the nodes encode the key node attribute to be matched in the subgraph pattern query. The system can support categorical node attributes. This can be extended to numerical attributes by quantizing the values. Additional node attributes are displayed in attachments to the nodes or in tooltips. The user can quickly select a group of nodes and the sub-graph they induce by brushing a rectangular area on the user interface. The user can also construct the pattern in a more precise manner by clicking the + and − buttons on the top right corner of each node. A minimap on the bottom right of the panel allows the user to easily navigate and explore graphs with larger sizes. When the nodes have inherent spatial locations, they can be used directly for display.

Regarding the query results labeled at (B1) and (B2), after the sub-graph pattern matching results are returned, the query results panel will be updated to display all the matching graphs as a small multiples display. Since the number of returned results could be large, the system supports sorting the returned graphs with graph attribute values such as number of nodes (see region (f)). The matching nodes are highlighted based on the results returned by the node alignment module. The graphs can be displayed either in a node-link diagram with the same layout to the graph in the query panel (B2) or in a thumbnail visualization designed to display the graph in a more compact manner (B1). In particular, the system uses topological sort of the nodes for directed acyclic graphs to order the nodes, layout them vertically and route the links on the right to obtain a compact view (B1).

Regarding the comparison view labeled at (E), the user can click on the zoom-in button on each small multiple to bring out the comparison view and review each matching graph in detail. The comparison view displays the query graph and the select matching graph side-by-side in a pop-up window. The matched nodes are highlighted for verification and comparison.

The user interface and visualization shown in FIGS. 6A-6D is merely one example of a way to provide the user with the ability to interactively compare graphs and sub-graphs and explore on a micro or macro level.

Figure 7A:
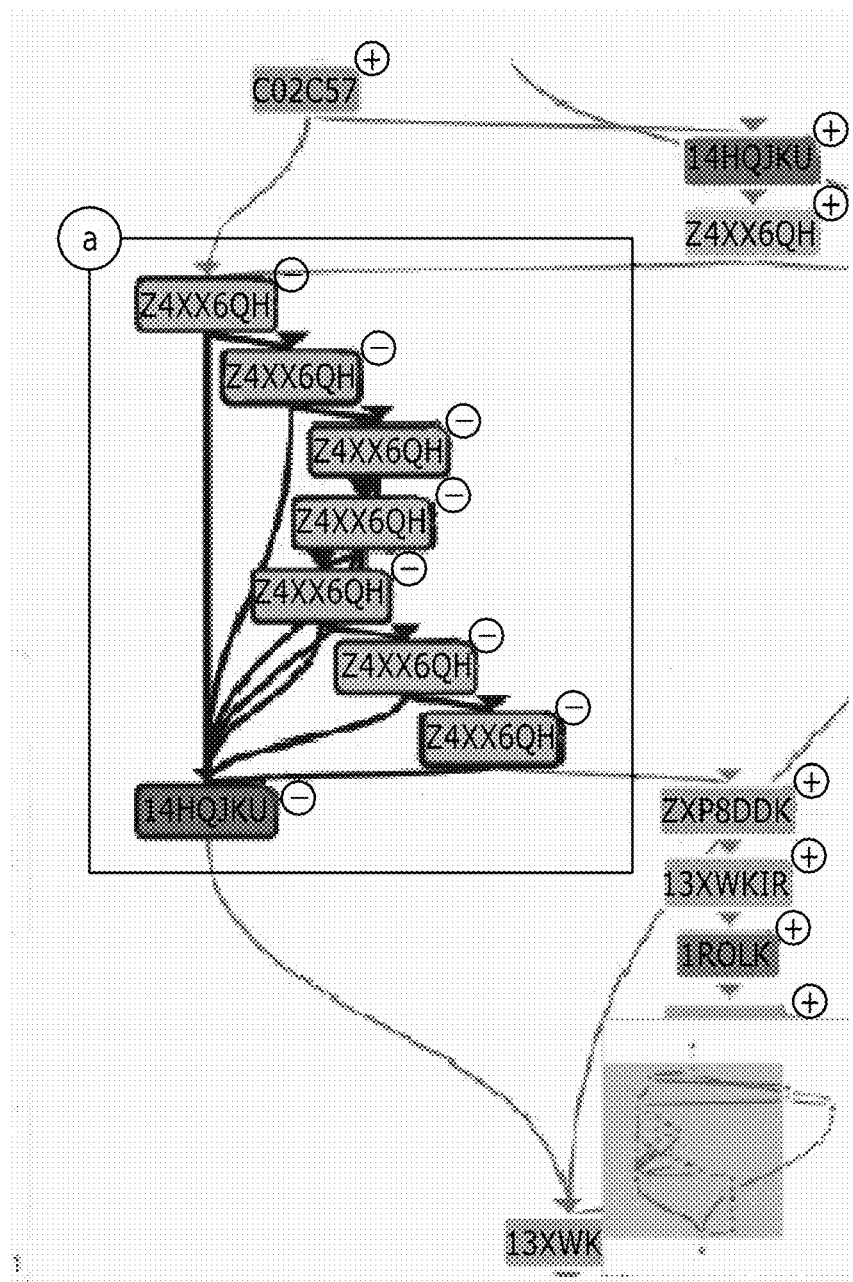
FIGS. 7A-7C illustrates another human-interactive graphical user interface for node correspondence and graph comparisons between the query nodes and the target nodes, according to an embodiment.
Figure 7B:
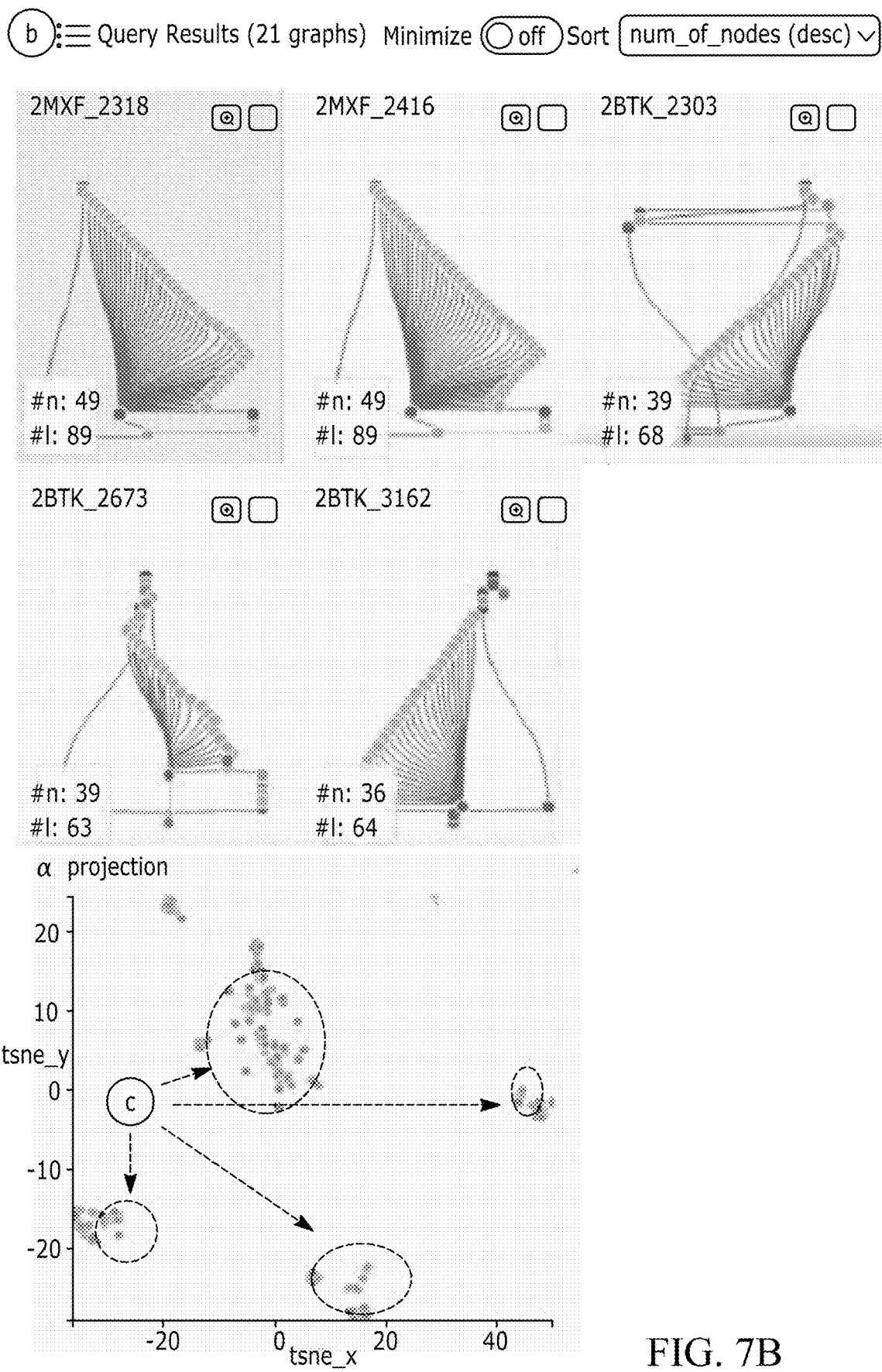
Figure 7C:
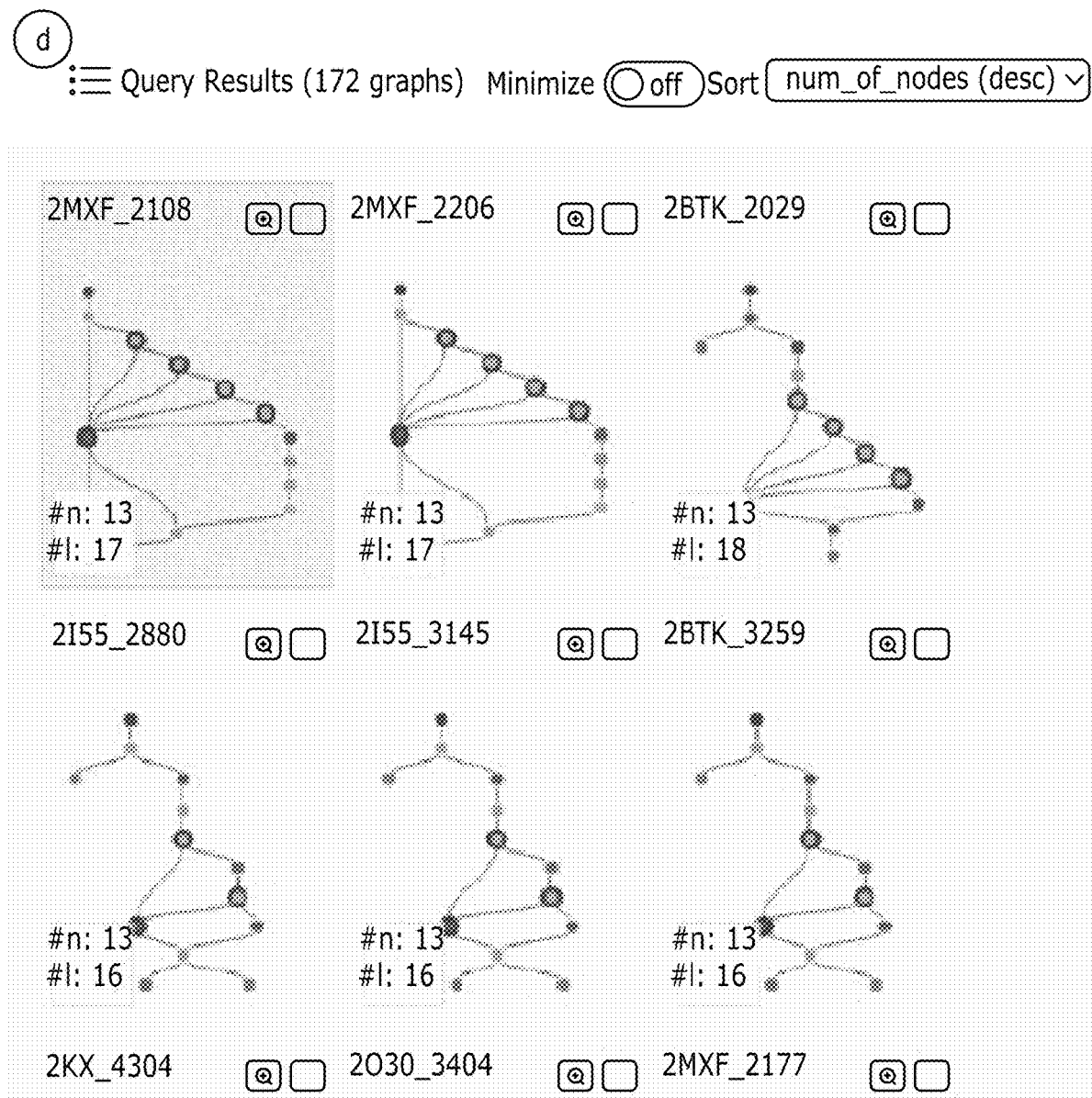

FIGS. 7A-7C shows another embodiment of a user interface with similar functionality as shown and described with reference to FIGS. 6A-6D. The user interface shows the query results for a fan-like structure selected from a graph— labeled at (a) in FIG. 7A. In this example, the system has returned 21 matched results with approximate search disabled. Indeed most of the returned graphs contain the fan-like structure—labeled at (b) in FIG. 7B—indicating another reusable submodule in the workflow creation process. In the t-SNE plot the graphs with the matching fan-like patterns are highlighted in a common color, showing the graphs are scattered in different clusters according to graph editing distance—labeled at (c) in FIG. 7B. This further verifies that such frequent subgraph patterns cannot be easily discovered by directly apply graph clustering algorithms. To further extend the search to graphs that may contain similar, but not the exact same patterns, the user toggles the button to enable approximate search (e.g., like FIG. 6B), and the returned result contains many more graphs—in this example, 172 graphs labeled at (d) in FIG. 7C. The user can sort the results based on number of nodes and find that the graphs with the approximate matches contain a simpler fan-like structure with less nodes. Based on the analysis the user concludes that the fan-like pattern can be used as a template in the future.

Figure 8:
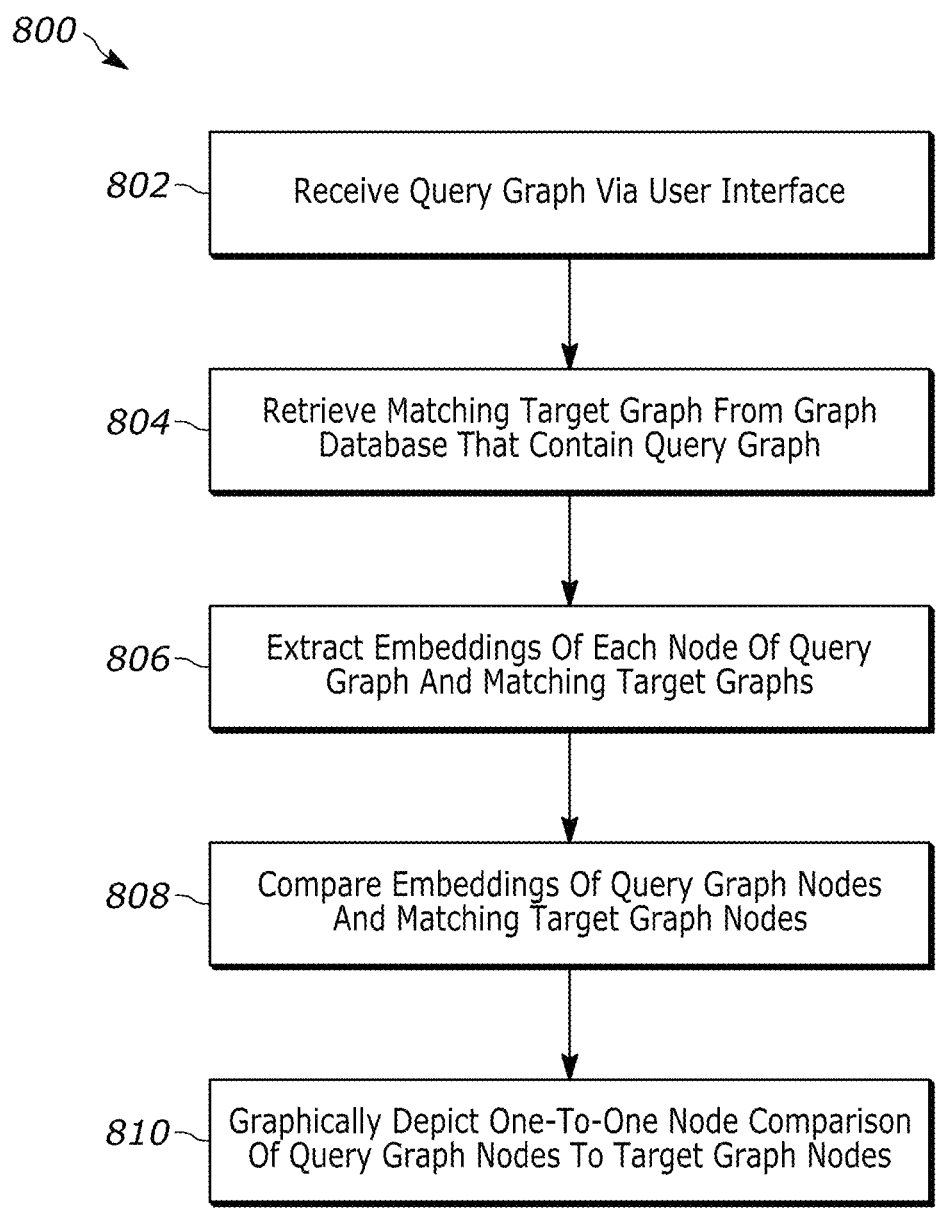
FIG. 8 illustrates a flow chart implemented by a processor for carrying out the systems disclosed herein, according to an embodiment.

FIG. 8 illustrates a flowchart that can be carried out by the processor(s) described herein. At 802, the processor receives a query graph via user interface. The query graph can include a plurality of query nodes connected by edges. At 804, the processor accesses a target graph database having a plurality of potential graphs that could contain the query graph, and retrieves target graphs from the graph database that contain the query graph therein. At 806, the processor extracts embeddings of each node of the query graph and each node of the matching target graphs. At 808, the processor compares the embeddings of the query graph nodes and the embeddings of the matching target graph nodes. This can be done on a one-to-one node basis, utilizing an attention network. At 810, the processor graphically depicts on the user interface the one-to-one node comparison of the query graph nodes and the target graph nodes.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for performing subgraph pattern searching with human-in-the-loop visual analytics, the computer-implemented method comprising:
    storing, in memory, a graph database containing a plurality of target graphs, each target graph having a plurality of target nodes connected by edges;
    receiving, via a user interface, a query graph having a plurality of query nodes;
    via a graph neural network, retrieve one or more matching target graphs from the graph database that each contain the query graph as a subgraph thereof;
    extracting embeddings of each of the query nodes and each of the target nodes of the one or more matching target graphs;
    performing, via a second graph neural network, a comparison of the embeddings of each query node with the embeddings of each target node of the one or more matching target graphs by determining a similarity between the extracted embeddings of the query nodes and the target nodes of the one or more matching target graphs; and
    generating, via the user interface, a graphical depiction of a one-to-one node correspondence between the query nodes and the target nodes of the one or more matching target graphs based on the comparison,
    wherein the graphical depiction of the one-to-one node correspondence between the query nodes and the target nodes of the one or more matching target graphs includes, for each node pair in the correspondence, a graphical depiction of the extracted embeddings of the query node and the target node.

2. The computer-implemented method of claim 1, wherein the embeddings for each of the query nodes and each of the target nodes of the one or more matching target graphs include attributes of that node, attributes of a neighboring node connected to that node, and attributes of a connection between that node and the neighboring node.

3. The computer-implemented method of claim 1, wherein the step of performing utilizes an attention network.

4. The computer-implemented method of claim 1, further comprising:
    developing a probability matrix that compares each of the query nodes with each of the target nodes of the one or more matching target graphs, wherein the probability matrix includes a probability of a match between each of the query nodes and each of the target nodes of the one or more matching target graphs.

5. The computer-implemented method of claim 1, wherein the step of performing the comparison is performed without segmenting the query graph and the one or more matching target graphs into neighborhoods of adjacent nodes.

6. The computer-implemented method of claim 1, wherein the query nodes and the target nodes include labels identifying objects in an image, wherein the labels include at least one of a person, a vehicle, a road, a building, a tree, or a road sign.

7. A visual analytics system configured to support human-in-the-loop subgraph pattern searching, the visual analytics system comprising:
    a user interface;
    a memory storing a target graph database having a plurality of target graphs, each target graph having a plurality of target nodes connected by edges; and
    a processor programmed to:
        via the user interface, receive a query graph having a plurality of query nodes;
        via a first graph neural network, retrieve one or more matching target graphs from the target graph database, wherein each of the one or more matching target graphs contains the query graph as a subgraph thereof;
        extract embeddings of each of the query nodes and each of the target nodes of the one or more matching target graphs;
        via a second graph neural network, compare the query nodes with the target nodes of the one or more matching target graphs by determining a similarity between the extracted embeddings of the query nodes and the target nodes of the one or more matching target graphs; and
        generate, on the user interface, a graphical depiction of a one-to-one node correspondence between the query nodes and the target nodes of the one or more matching target graphs based on the comparing,
        wherein the graphical depiction of the one-to-one node correspondence between the query nodes and the target nodes of the one or more matching target graphs includes, for each node pair in the correspondence, a graphical depiction of the extracted embeddings of the query node and the target node.

8. The visual analytics system of claim 7, wherein the processor is further programmed to:
    perform a comparison of the embeddings of each query node with the embeddings of each target node of the one or more matching target graphs.

9. The visual analytics system of claim 8, wherein the processor is further programmed to utilize an attention network to perform the comparison.

10. The visual analytics system of claim 7, wherein the processor is further configured to develop a probability matrix comparing each of the query nodes with each of the target nodes of the one or more matching target graphs, wherein the probability matrix includes a probability of a match between each of the query nodes and each of the target nodes of the one or more matching target graphs.

11. The visual analytics system of claim 7, wherein the processor is further programmed to compare the query nodes with the target nodes on a one-to-one comparison.

12. The visual analytics system of claim 11, wherein the processor is further programmed to compare the query nodes with the target nodes on the one-to-one comparison without segmenting the query graph and the one or more matching target graphs into neighborhoods.

13. The visual analytics system of claim 7, wherein the query nodes and the target nodes include labels identifying objects in an image, wherein the labels include at least one of a person, a vehicle, a road, a building, a tree, or a road sign.

14. The visual analytics system of claim 7, wherein the processor is further configured to generate, on the user interface, a graph query panel configured to allow a user to interactively construct the query graph by selecting the query nodes.

15. The visual analytics system of claim 7, wherein the processor is further configured to generate, on the user interface, a query results window that displays all the one or more matching target graphs, with each of the target nodes that correspond to the query nodes being highlighted or colored.

16. A system comprising:
- a memory storing a target graph database having a plurality of target graphs, each target graph having a plurality of target nodes connected by edges; and
- a processor communicatively connected to the memory and programmed to:
  - receive a query graph having a plurality of query nodes;
  - retrieve, utilizing a first graph neural network, one or more matching target graphs from the target graph database, wherein each of the one or more matching target graphs contains the query graph as a subgraph thereof;
  - extract embeddings of each of the query nodes and each of the target nodes of the one or more matching target graphs;
  - determine, utilizing a second graph neural network, a similarity between the extracted embeddings of the query nodes and the target nodes of the one or more matching target graphs with a one-to-one node correspondence; and
  - generate a graphical depiction of the one-to-one node correspondence between the query nodes and the target nodes of the one or more matching target graphs,
  - wherein the graphical depiction of the one-to-one node correspondence between the query nodes and the target nodes of the one or more matching target graphs includes, for each node pair in the correspondence, a graphical depiction of the extracted embeddings of the query node and the target node.

17. The system of claim 16, wherein the processor is further programmed to utilize an attention network to compare the embeddings of each query node with the embeddings of each target node of the one or more matching target graphs.

* * * * *